(12) United States Patent
Schultheis et al.

(10) Patent No.: US 9,904,013 B2
(45) Date of Patent: Feb. 27, 2018

(54) LIGHT GUIDE WITH OPTICAL ELEMENT MOLDED THERETO

(71) Applicant: SCHOTT AG, Mainz (DE)

(72) Inventors: Bernd Schultheis, Schwabenheim (DE); Thomas Weingärtner, Gau-Algesheim (DE); Holger Werner, Denkendorf (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 15/346,972

(22) Filed: Nov. 9, 2016

(65) Prior Publication Data

US 2017/0052319 A1  Feb. 23, 2017

Related U.S. Application Data

(63) Continuation of application No. PCT/EP2015/059511, filed on Apr. 30, 2015.

(30) Foreign Application Priority Data

May 9, 2014  (DE) .......................... 10 2014 208 756

(51) Int. Cl.
   *G02B 6/26*  (2006.01)
   *G02B 6/32*  (2006.01)
   (Continued)

(52) U.S. Cl.
   CPC ........ *G02B 6/262* (2013.01); *B29D 11/00865* (2013.01); *G02B 5/0242* (2013.01);
   (Continued)

(58) Field of Classification Search
   None
   See application file for complete search history.

(56) References Cited

U.S. PATENT DOCUMENTS 3,788,827 A * 1/1974 De Luca ................. C03B 37/14
                                                                 385/123
4,653,847 A * 3/1987 Berg ...................... G02B 6/4203
                                                                 385/79
(Continued)

FOREIGN PATENT DOCUMENTS

DE         2546861        4/1977
DE         9207943       10/1992
(Continued)

OTHER PUBLICATIONS

English translation of Written Opinion dated Jul. 7, 2015 for corresponding PCT/EP2015/059511, 10 pages.
(Continued)

*Primary Examiner* — Mike Stahl
(74) *Attorney, Agent, or Firm* — Ohlandt, Greeley, Ruggiero & Perle, L.L.P.

(57) ABSTRACT

A light guide for industrial, medical, or cosmetic applications is provided, having an outer circumferential surface and at least one end face made of glass, with an optical element made of at least one transparent plastic directly molded to the end face of glass by molding or reactive injection molding, so that the electromagnetic radiation guided in the light guide when in its operational state is directed through the end face of glass into the transparent plastic of the optical element and exits therefrom.

18 Claims, 4 Drawing Sheets

(51) Int. Cl.
*G02B 6/24* (2006.01)
*F21V 8/00* (2006.01)
*B29D 11/00* (2006.01)
*G02B 5/02* (2006.01)

(52) U.S. Cl.
CPC .......... *G02B 6/0008* (2013.01); *G02B 6/241* (2013.01); *G02B 6/32* (2013.01)

(56) References Cited

U.S. PATENT DOCUMENTS

| | | | | |
|---|---|---|---|---|
| 5,196,005 A | * | 3/1993 | Doiron | A61B 18/22 385/115 |
| 5,271,073 A | * | 12/1993 | Hui | G01N 21/7703 385/12 |
| 5,345,545 A | * | 9/1994 | Uemiya | B82Y 30/00 359/332 |
| 5,536,265 A | * | 7/1996 | van den Bergh | A61B 18/22 606/15 |
| 6,629,772 B2 | | 10/2003 | Brunfeld | |
| 7,751,661 B2 | | 7/2010 | Kadomi et al. | |
| 2003/0138573 A1 | * | 7/2003 | Mikhael | C03C 17/32 427/569 |
| 2003/0179994 A1 | * | 9/2003 | Caracci | G02B 6/32 385/33 |
| 2006/0104593 A1 | * | 5/2006 | Gowda | G02B 6/262 385/140 |
| 2007/0199814 A1 | | 8/2007 | Kobayashi et al. | |
| 2011/0103740 A1 | * | 5/2011 | Shacklette | G02B 6/3506 385/22 |
| 2012/0006468 A1 | * | 1/2012 | Stopford | G02B 6/4402 156/175 |
| 2012/0182758 A1 | | 7/2012 | Nath | |
| 2013/0265776 A1 | | 10/2013 | Zoellner et al. | |

FOREIGN PATENT DOCUMENTS

| | | |
|---|---|---|
| DE | 4219353 | 12/1993 |
| DE | 102012100375 | 7/2012 |
| EP | 1672755 | 6/2006 |
| EP | 2204606 | 7/2010 |
| EP | 2600181 | 6/2013 |
| FR | 2529348 | 12/1983 |

OTHER PUBLICATIONS

English translation of International Preliminary Report on Patentability dated Nov. 15, 2016 for corresponding PCT/EP2015/059511, 13 pages.

International Search Report dated Jul. 7, 2015 for corresponding PCT/EP2015/059511, 5 pages.

* cited by examiner

LIGHT GUIDE WITH OPTICAL ELEMENT MOLDED THERETO

CROSS REFERENCE TO RELATED APPLICATIONS

This application is a continuation of International Application No. PCT/EP2015/059511 filed on Apr. 30, 2015, which claims the benefit under 35 U.S.C. 119 of German Application No. 102014208756.2 filed on May 9, 2014, the entire contents of both of which are incorporated by reference herein.

BACKGROUND

1. Field of the Invention

The invention relates to light guides in general, more particularly to rigid fiber optic light guides having optical elements made of highly transparent plastic molded thereto, and to applications thereof.

2. Description of Related Art

Rigid fiber optic light guides are known from prior art in the form of dental light guide rods. They are usually made by drawing glass rods or a bundle of core-cladding rods. They may be overmolded with a plastic, inter alia, as a sleeve. The plastic material used for this purpose is a black opaque, usually glass fiber reinforced PPS plastic (e.g. FORTRON® by TICONA). Such mounting sleeves are used for accommodating the dental light guide rod in a close fit in a handpiece that comprises the light source.

These sleeves are enclosing portions of the outer circumferential surface of the light guide, the end face of the light guide made of glass is exposed. The emission profile of the electromagnetic radiation guided in the light guide is therefore mainly determined by the geometry and refractive index of the glass of the light guide. If different emission profiles are required, for example in order to achieve additional focusing and/or homogenization of the light, further optical systems will be needed, which have to be attached to the light guide. In particular for medical or cosmetic applications the problem arises that the light guide must be hygienically cleanable and therefore must be capable of being sterilized and/or autoclaved. With prior art lens systems which include lens frames, lens cementing and seats for mounting on the light guide this requirement cannot be met or only with very great expenditure.

DE 10 2012 100 375 A1 discloses a light guide whose optical properties are adjusted by employing liquid polymers. In particular, over the light exit surface a region with these liquid polymers can be located, which are enclosed by a sealing cap. For such a light guide it will be difficult to resist mechanical stresses, in particular because if the sealing cap is pulled off the liquid polymers may leak.

SUMMARY

Given this background it is an object of the present invention to provide a light guide made of glass for industrial, medical, or cosmetic applications, with optical functions that can be extended in a simple but robust manner, with improved adhesion and therefore high withdrawal forces and with very good resistance to autoclaving, and to specify a method for its production as well as particularly advantageous applications thereof.

A light guide according to the invention has an outer circumferential surface and at least one end face. Typically, the light guide is a narrow and elongated item. Usually it is made of glass, at least the core thereof, including a plurality of fiber rods of different glass compositions. The light guide may be configured as a rigid light guide in the form of a fiber rod or light guide rod, or as a flexible light guide, with light entry and/or light exit faces bonded or heat-fused to one other. The portion of the light guide made of glass terminates in an end face of glass. An optical element made of at least one transparent plastic is molded onto this end face of glass, so that the electromagnetic radiation guided in the light guide when in its operational state is directed through the end face of glass into the transparent plastic material of the optical element and exits therefrom. The molded optical element shapes the radiation passing through the element when in its operational state and thus determines the emission profile of the light guide according to the invention.

The inventors have realized that the object may be achieved in a surprisingly simple manner by molding the optical element of plastic directly to the end face of glass. This ensures high withdrawal forces for the optical element so that a durable and mechanically stable connection is provided between the end face and the optical element. Transparent in the context of the invention means that the plastic of the optical element is transparent for the electromagnetic radiation guided through the light guide when in its operational state. In particular, transmittance values of the optical element of at least 90% or more are advantageously employed, which are mainly achieved by the selection of the plastics.

The plastic of the molded optical elements is advantageously selected from the group consisting of liquid silicone rubbers (LSR), in particular hot-linking liquid silicone rubbers which exhibit high transparency and high temperature resistance. The forces for withdrawal of the optical element from the end face of the light guide made of glass are advantageously more than 80 N, in particular more than 100 N. More particularly, the optical element is non-detachably connected to the end face of the light guide of glass, that is to say when the optical element is withdrawn from the end face the light guide will be damaged or even destroyed.

In principle, other highly transparent and thermally stable plastics are as well suitable for molding such optical elements, although shrinkage behavior and adhesion to the glass are decisive. Although PC or PMMA have very good optical properties, they exhibit rather low chemical resistance and temperature resistance. A transparent thermoplastic material such as polyetherimide (PEI, e.g. ULTEM by GE Plastics) would actually be suitable in view of the required autoclaving resistance, but has an intrinsic amber color and moreover is difficult to process. Silicones are preferred due to their permanent elasticity.

According to the invention, the optical element made of transparent plastic is directly molded to the end face of glass, so an interface exists between the end face and the entry face of the optical element and thus an interface between glass and plastic. In particular, the optical element is positively and materially bonded to the end face. In order to increase mechanical stability, it may preferably as well be contemplated that an adhesion promoter is provided on the glass surface of the light guide, especially on the end face of glass, so that an interface sequence of glass to adhesion promoter to transparent plastic is existing.

Furthermore, physical and/or chemical surface pretreatments of the glass surface may be advantageous, in particular for surface activation and generation of high surface energy. Such methods include corona discharge, plasma pretreatment, e.g. at atmospheric pressure plasma, or etching of the surface, inter alia. The pretreatment may in particular be performed prior to the application of the adhesion promoter and/or prior to the molding of the optical element.

The optical element of transparent plastic may as well be formed so that it protrudes beyond the end face of glass and covers at least sections of the outer circumferential surface of the light guide. Complete coverage of the light guide is as well conceivable. The contact area between the optical element and the light guide of glass is increased thereby, so that improved adhesion and greater withdrawal forces can be achieved.

As mentioned before, the optical element has the task of shaping the electromagnetic radiation passing through the element when in its operational state. In particular it may function as a converging lens or as a diverging lens and/or as a light mixer. By combining different transparent plastics, in particular by combining layers of transparent plastics having different refractive indices, the beam-shaping and/or mixing properties of the optical element may be selectively adjusted.

It is also possible that the optical element is covered, at least in sections thereof, by a covering element made of a plastic that is different from the transparent plastic of the optical element. Such a covering element may then for instance serve as a protection for the transparent plastic, for example against mechanical damage, and/or may prevent lateral light emission.

In a preferred embodiment, the outer circumferential surface of the light guide has features, so-called undercut portions which are interengaging with integrally molded features of the optical element and/or of the covering element. In this manner the optical element may be locked to the light guide so to speak, whereby preferably the withdrawal force for the optical element from the light guide is again further increased.

Particularly preferably, the light guide is formed by a glass rod or a plurality of non-releasably interconnected glass rods, and preferably the glass rods are core-cladding rods. Core-cladding rods are typically glass rods having a core made of a glass which is surrounded by a cladding of a glass that has a lower refractive index than the glass of the core.

An inventive method for producing a light guide as described above comprises the following method steps: A light guide with at least one conducting region made of glass is provided, which has an end face of glass; an injection mold is provided which includes the negative contour of the optical element; at least one plastic precursor is provided, by which the optical element is defined upon completion of curing of the plastic precursor; at least the end face of the light guide is introduced into the injection mold; and the plastic optical element is molded by reactive injection molding, wherein at least the end face of the light guide is covered with the at least one plastic precursor and the plastic precursor is cured thereby creating the optical element.

As described above, LSR is preferably used as the plastic material. The method of reactive injection molding is known. What is surprising is that it can be used for producing an optical element directly and non-withdrawably bonded to a glass light guide.

In a particularly preferred embodiment of the method, an adhesion promoter is applied at least to partial areas of the regions of the light guide which are to be covered with the plastic material of the optical element, before the optical element is molded to the end face of the light guide. In a particularly advantageous implementation, the adhesion promoter, also referred to as primer or adhesive cleaner, is a polysilane or silane compound. With this pretreatment it is achieved that on the one hand the surface is cleaned and in particular fat or dirt layers are removed, and on the other that the glass surface is chemically preconditioned so that in addition to a pure form fit a chemical bond can be created between the Si—O bonds in the glass and the Si—OH groups in the silicone. As already described above, chemical and/or physical pretreatment methods may also be employed, by which the glass surface can be activated. Besides the elimination of water films and organic contaminants, the surface can be additionally activated in this way in order to achieve a good adhesive bond.

According to one variation of the method it may as well be contemplated that the optical element is molded to the light guide by a dip coating process rather than by injection molding. In this case it is contemplated that the light guide is dipped into a mold with the liquid silicone and is subsequently tempered. This in particular permits to produce thin coatings on the light guide. Here, too, it may be contemplated to pretreat the surface of the light guide with an adhesion promoter, at least locally.

The light guide according to the invention is preferably employed in a dental lighting device, in particular a dental curing device, in a device for curing industrially applicable adhesives, e.g. in electronics, or in a dental handpiece, e.g. as a component of a turbine. Applications in the field of ear, nose or throat medicine are also conceivable.

Moreover, applications in the lighting sector are likewise conceivable, e.g. for showcase lighting or for furniture lighting in which rigid or flexible light guides are equipped with an optical element on the light exit surface.

A particularly cost-efficient variant of a light guide with an optical element molded thereto can be realized if the fiber or light conducting rod is simply sawn and optionally grinded and subsequently the optical element is molded from liquid silicone onto this rough sawn surface. By a best possible adaptation of the refractive indices of the light guide and the optical element (i.e. index matching), the textures of the sawn or grinded fiber or light guide rod surfaces can be almost smoothed down optically without requiring any expensive polishing step. This in particular permits to address low-cost applications as well.

DESCRIPTION OF THE DRAWINGS

The invention will be illustrated in further detail with reference to the figures. All figures are schematic, the dimensions and proportions of the real items may differ from those in the figures.

DETAILED DESCRIPTION

Figure 1:
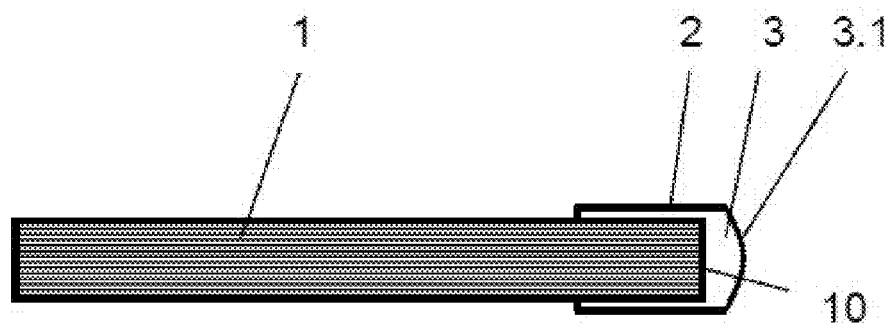
FIG. 1 shows a light guide with an optical element molded thereto, which performs the function of a converging lens.

FIG. 1 shows a light guide 1 made of glass and terminating in an end face 10 to which an optical element 3 of transparent plastic is molded directly or with an adhesion promoting layer. The resulting entire light guide 1 is integrally formed, as described, which is to say the optical element 3 is permanently bonded to the glass portion of the light guide 1. Optical element 3 has a free end which is shaped so as to function as a converging lens. In the present exemplary embodiment, optical element 3 has an extension 2 covering portions of the lateral circumferential surface of the light guide 1. In this way, the contact area between the plastic and the glass of the light guide 1 is increased, whereby higher withdrawal forces are achieved than if the plastic material of optical element 3 would only contact the light guide 1 at the end face 10 thereof.

The exemplary embodiments shown in the figures were produced using the approach as described below. Light guides 1 consisting of straight, curved and/or tapering fiber rods 1.1 (multi-core rods, abbreviated MCR) or light guide rods (single core rods, abbreviated SCR) or combinations of both types are overmolded at the ends thereof with a highly transparent silicone, by an injection molding process. In this manner, the optical element 3 is integrally molded. Here, a reactive injection molding process was employed, in which components A and B, both of which are liquid, are mixed and then injected into a tool under pressure. Vulcanization occurs under heat within the tool. Typical vulcanization times were from 3 to 10 seconds per mm wall thickness, with a higher temperature resulting in faster interlinking. Details about the process have been described in relevant literature and are readily available for the public.

In particular the silicone materials mentioned can be highly transparent, so that optical elements such as lenses or light guide elements can be produced therefrom. For example, the liquid silicone rubber (LSR) variants of the LSR 7000 series by MOMENTIVE exhibit high transmittance (>90%) and good resistance to UV light. A further preferred LSR variant is LSR type LUMISIL® LR 7600 by WACKER. Moreover, sufficiently high temperature resistance is provided to resist even to the preparation methods commonly employed in the medical field, such as autoclaving (e.g. at 3 bar, 134° C., 10 min. holding time). Moreover, Shore hardnesses in a range from 5 to 90 Shore A can be achieved, so that different applications can be addressed. This results in a larger application range as compared to PMMA or PC, in particular for use as lighting devices in the medical and/or cosmetic field. Alternatives to the above-mentioned materials are, e.g., LSR variants of DOW CORNING, which are known under the name Silastic® LC series, or MS-1002.

Figure 2:
FIG. 2 shows a light guide with an optical element molded thereto, which performs the function of a diverging lens.

The shape of optical element 3 is in particular determined by the requirements for its beam-shaping function. FIG. 2 illustrates a light guide 1 with an optical element 3 molded thereto, which functions as a diverging lens and therefore has a concave light exit surface 3.2. The functionality of a converging lens of the optical element shown in FIG. 1 requires a convex shape of the light exit surface 3.1.

Figure 3:
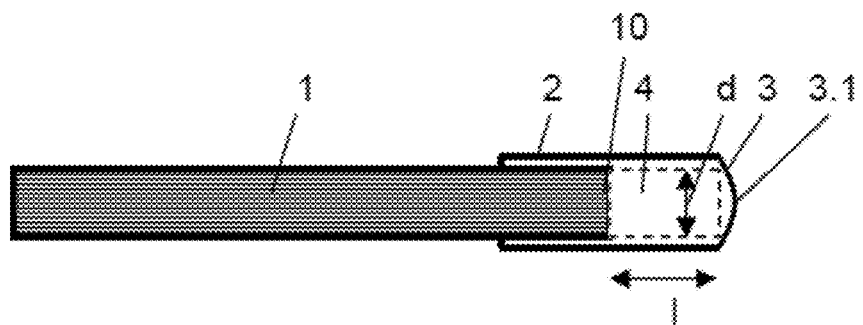
FIG. 3 shows a light guide with an optical element molded thereto, which performs the function of a light mixer.

The optical element 3 according to FIG. 3 has the function of a converging lens 3.1 at its light exit surface, however, upstream thereof a mixing zone 4 is provided which functions as a light mixer for homogenizing the light exiting from end face 10 in the operational state. Here, again, the optical element can be made integrally, that means the beam-shaping light exit surface 3.1 and the mixing zone 4 can be implemented in a single component. For light mixing and/or homogenization in the mixing zone 4 it may be advantageous if the mixing zone comprises an extended portion compared to the diameter (length l, diameter D). For example a ratio l/d>1, ideally l/d>2, is advantageous, as shown in FIG. 3 by way of example.

Figure 4:
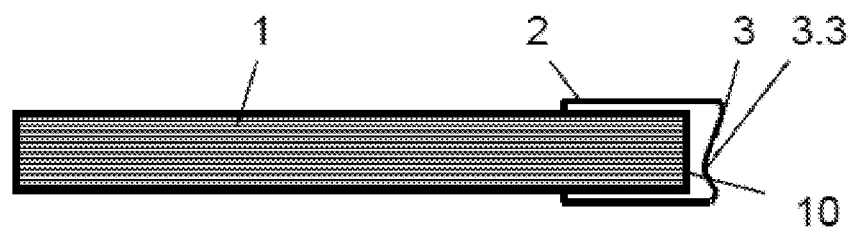
FIG. 4 shows a light guide with an optical element molded thereto, which is used for beam shaping and may have any desired surface topography.

The optical element 3 according to FIG. 4 may as well have any desired shape at the exit surface 3.3 which is determined by the intended beam shaping characteristic. For example aspherical surfaces and/or a combination of diverging and focusing surfaces are possible. The optical element 3 may as well be formed as a tapering elongated flexible light guide rod.

By selectively introducing scattering particles into near-surface zones of the transparent plastic material it is for instance even possible to achieve a side-emitting effect which permits to illuminate interdental spaces, for example. Scattering particles which are introduced into the volume of the plastic material of the optical element 3 may furthermore serve to homogenize the light guided in the optical element 3. Both effects may of course be combined as well.

Since the optical element 3 is obtained by the injection molding process described above, in which the shape of the light exit surface is produced by the negative shape of the injection mold, all what is required is to produce the appropriate shape once, and then light guides 1 with the respective optical elements 3 molded thereto can be produced in large numbers. Typically, no further processing of the light exit surface of the optical element 3 will be required, however, further measures such as polishing and/or coating with functional layers may of course be performed, if desired.

Figure 5:
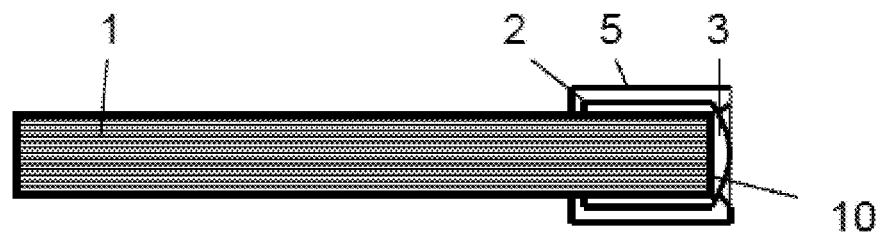
FIG. 5 shows a light guide with an optical element molded thereto, which is protected by a covering element.

In a further overmolding process, the optical element 3 may be overmolded with a colored, preferably opaque second layer 5 as a covering element, for example in order to prevent lateral light emission, to protect the optical element mechanically, and/or for color labelling of the light guide 1. Such a light guide 1 is illustrated in FIG. 5.

Figure 6:
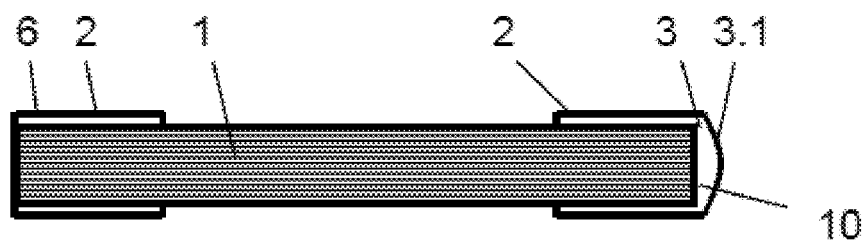
FIG. 6 shows a light guide with an optical element molded thereto and with a mounting sleeve for coupling to a light source.

FIG. 6 shows that it is furthermore possible to mold sleeves 6 near the light entry surface of light guide 1, which for instance allow the light guide to be coupled to a light source. Because of the lower hardness of a silicone layer in the form of an assembly sleeve 6 as compared to glass, a less expensive interference fit receptacle means can be implemented. The currently high tolerance requirements can thus be reduced, which may have a positive effect on production costs.

In order to guarantee high withdrawal forces (of usually more than 100 N) adhesion promoters are advantageous for increasing adhesion between the silicone and the light guide 1, which are applied to the glass light guide 1 prior to the overmolding process. For this purpose, silane compounds, also known as primers, are applied before the injection molding process. In addition to cleaning, the glass surface is usually preconditioned so that it can create a chemical bond with the silicone.

Very good adhesion was achieved with a plasma pretreatment using an atmospheric pressure plasma (AP plasma). In this case, the light guide is directed past a plasma flame at a certain distance thereof prior to the overmolding process, whereby the surface is cleaned, moisture is removed, and/or additionally the surface is activated.

In this way, withdrawal forces of >200 N, typically about 250 N were achieved, for example with respective fiber rod specimens with a test cross section of 10 mm diameter. The surface of the specimen was subjected to an AD plasma flame at a distance of about 10 to 15 mm. The silicone material employed was LUMISIL® LR 7600/70 by WACKER. Even after 200 autoclaving cycles (each at 134° C., 3 bar, 10 min. holding time) adhesion was still about 65% of that of the initial value.

Figure 7:
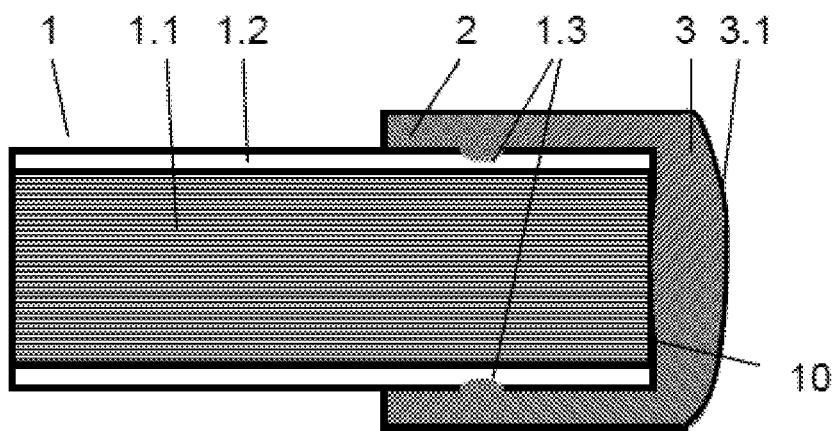
FIG. 7 shows a light guide with an optical element molded thereto, which is additionally mechanically stabilizes by being locked on the light guide.

In addition, an undercut region 1.3 of the cladding of the light guide 1 for obtaining a form-fit connection may improve adhesion. According to FIG. 7, small cuts or notches are introduced into the cladding of light guide 1 for this purpose, which interengage with the extension 2 of the optical element 3 of plastic.

Since basically due to the existence of interfaces the resulting light power is lower, it is favorable to use a core glass material for the light guide 1 which exhibits particularly good transmittance, especially in the blue spectral range. In this manner it can be achieved that the losses arising at the interfaces can be compensated for or even overcompensated by a basically better transmission of the glass rods.

If optical elements 3 are molded which have extensions of the plastic material protruding beyond the end face 10 of light guide 1 and covering sections of the outer circumferential surface of the light guide 1, particularly in the area adjoining the end face 10, these optical elements 3 integrally formed in the above-described manner may furthermore offer the added benefit of providing additional mechanical protection. On the other hand, by selectively choosing the Shore hardness of the employed LSR material it is possible to achieve a specific haptic feel.

In an advantageous embodiment, the invention furthermore contemplates coating of the entire light guide with the plastic, which may also be implemented by injection molding as described above. In an alternative process variation it may also be envisaged that the optical element 3 is molded to the light guide 1 by a dip coating process. In this case it is contemplated that the light guide 1 is immersed in a mold containing the liquid silicone and is subsequently tempered. In this manner it is possible to produce thin coatings on the light guide 1. Here, again, it may be envisaged to pretreat the surface of the light guide 1 with an adhesion promoter, at least locally.

Compared to the prior art, the light guides 1 according to the invention offer the advantage of improved illumination properties in a simple and durable way, due to the beam-shaping and/or beam-homogenizing properties of the optical element. Moreover, the end faces 10 of glass can be mechanically protected from damage. The resulting light guides 1 with an optical element 3 molded thereto are capable of being sterilized and/or autoclaved as an entire component, so that they meet highest hygiene requirements.

Figure 8:
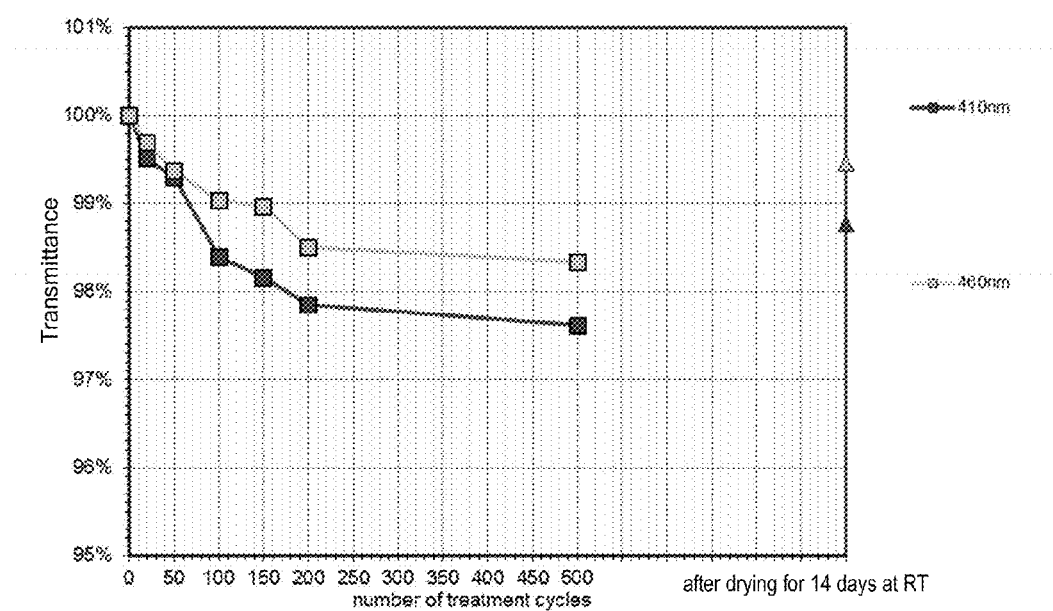
FIG. 8 is a graph of transmittance behavior of a light guide as a function of autoclaving cycles.

FIG. 8 shows, by way of example, a diagram of transmittance behavior as a function of autoclaving cycles (at 134° C., 3 bar, 10 min. holding time in each case). In this case, the light guides 1 were pretreated with an AD plasma. As shown by the curves for radiation at a wavelength of, e.g., 460 nm and 410 nm, there is only a slight loss in transmittance at the beginning, within the first 200 cycles. By drying at room temperature (RT) to allow the water incorporated by the autoclaving cycle to re-escape at least partially, this loss in transmittance was partially offset by 14 days. The result shows that in this manner in particular preparation requirements for medical applications, such as in the dental sector, can be met.

LIST OF REFERENCE NUMERALS

1 Light guide
1.1 Single fiber
1.2 Cladding
1.3 Undercut region
2 Extension
3 Optical element
3.1 Converging lens
3.2 Diverging lens
3.3 Any customized beam shaping
4 Mixing zone
5 Covering element
6 Mounting sleeve
10 End face

What is claimed is:

1. A light guide for industrial, medical, or cosmetic applications, comprising:
    an outer circumferential surface and an end face made of glass; and
    an optical element made of a transparent plastic comprising liquid silicone rubber, the optical element being directly molded to the end face so that the optical element is form fit to the end face and has a light exit surface of a shape selected from the group consisting of concave, convex, aspherical, and any combinations thereof,
    wherein the end face comprises a chemical and/or physical pretreatment, the pretreatment forming a chemical bond between the glass of the end face and the plastic of the optical element,
    wherein the form fit and the chemical bond form a connection between the glass of the end face and the plastic of the optical element is resistant to withdrawal, and
    wherein electromagnetic radiation guided in the light guide when in an operational state is directed through the end face into the transparent plastic of the optical element and exits therefrom.

2. The light guide as claimed in claim 1, wherein the pretreatment eliminates water films and organic contaminants and activates the end face.

3. The light guide as claimed in claim 1, wherein the pretreatment is a physical pretreatment.

4. The light guide as claimed in claim 1, wherein the pretreatment is a corona discharge pretreatment or a plasma pretreatment.

5. A light guide for industrial, medical, or cosmetic applications, comprising:
    an outer circumferential surface and an end face made of glass; and
    an optical element made of a transparent plastic comprising liquid silicone rubber, the optical element being form fit to the end face,
    wherein the end face comprises a chemical and/or physical pretreatment, the pretreatment forming a chemical bond between the glass of the end face and the plastic of the optical element,
    wherein the form fit and the chemical bond form a connection between the glass of the end face and the plastic of the optical element is resistant to withdrawal,
    wherein electromagnetic radiation guided in the light guide when in an operational state is directed through the end face into the transparent plastic of the optical element and exits therefrom, and
    wherein the pretreatment is an atmospheric pressure (AP) plasma flame pretreatment.

6. A light guide for industrial, medical, or cosmetic applications, comprising:
    an outer circumferential surface and an end face made of glass; and an optical element made of a transparent plastic comprising liquid silicone rubber, the optical element being form fit to the end face, wherein the end face comprises a chemical and/or physical pretreatment, the pretreatment forming a chemical bond between the glass of the end face and the plastic of the optical element, wherein the form fit and the chemical bond form a connection between the glass of the end face and the plastic of the optical element is resistant to withdrawal, wherein electromagnetic radiation guided in the light guide when in an operational state is directed through the end face into the transparent plastic of the optical element and exits therefrom, and wherein, when the end face has a diameter of 10 mm, the connection between the glass of the end face and the plastic of the optical element requires a withdrawal force of more than 80 N.

7. The light guide as claimed in claim 6, wherein the withdrawal force is more than 200 N.

8. The light guide as claimed in claim 6, wherein the withdrawal force is 250 N.

9. The light guide as claimed in claim 1, further comprising a glass to transparent plastic interface created between the end face and the optical element.

10. A light guide for industrial, medical, or cosmetic applications, comprising:

an outer circumferential surface and an end face made of glass; and an optical element made of a transparent plastic comprising liquid silicone rubber, the optical element being form fit to the end face, wherein the end face comprises a chemical and/or physical pretreatment, the pretreatment forming a chemical bond between the glass of the end face and the plastic of the optical element, wherein the form fit and the chemical bond form a connection between the glass of the end face and the plastic of the optical element is resistant to withdrawal, wherein electromagnetic radiation guided in the light guide when in an operational state is directed through the end face into the transparent plastic of the optical element and exits therefrom, and wherein the transparent plastic comprises scattering particles, wherein the scattering particles cause lateral emission of the electromagnetic radiation guided in the optical element.

11. A light guide for industrial, medical, or cosmetic applications, comprising:

an outer circumferential surface and an end face made of glass; and an optical element made of a transparent plastic comprising liquid silicone rubber, the optical element being form fit to the end face, wherein the end face comprises a chemical and/or physical pretreatment, the pretreatment forming a chemical bond between the glass of the end face and the plastic of the optical element, wherein the form fit and the chemical bond form a connection between the glass of the end face and the plastic of the optical element is resistant to withdrawal, wherein electromagnetic radiation guided in the light guide when in an operational state is directed through the end face into the transparent plastic of the optical element and exits therefrom, and wherein the outer circumferential surface comprises a feature that inter-engages with a feature of the optical element in a manner sufficient to increase a withdrawal force required for releasing the connection between the glass of the end face and the plastic of the optical element.

12. The light guide as claimed in claim 1, wherein the glass comprises a glass rod.

13. A light guide for industrial, medical, or cosmetic applications, comprising:

an outer circumferential surface and an end face made of glass; and an optical element made of a transparent plastic comprising liquid silicone rubber, the optical element being form fit to the end face, wherein the end face comprises a chemical and/or physical pretreatment, the pretreatment forming a chemical bond between the glass of the end face and the plastic of the optical element, wherein the form fit and the chemical bond form a connection between the glass of the end face and the plastic of the optical element is resistant to withdrawal, wherein electromagnetic radiation guided in the light guide when in an operational state is directed through the end face into the transparent plastic of the optical element and exits therefrom, and wherein the glass comprises a plurality of non-releasably interconnected glass rods.

14. The light guide as claimed in claim 13, wherein the plurality of non-releasably interconnected glass rods are core-cladding rods.

15. The light guide as claimed in claim 1, wherein the light guide is configured for uses in a device selected from the group consisting of a dental lighting device, a dental curing device, an industrially employable device for curing adhesives, an otoscope, a showcase lighting application, and a furniture lighting application.

16. A method for producing a heat-resistant light guide, comprising the steps of:

providing a glass light guide having an end face;

atmospheric pressure plasma flame pretreating the end face of the glass light guide so that water films and organic contaminants are eliminated and the end face is activated;

providing a mold including a negative contour of an optical element;

providing a transparent plastic precursor from which the optical element is formed, the transparent plastic comprises liquid silicone rubber;

introducing the transparent plastic precursor into the mold;

molding the optical element to the end face so that a bond is created between the glass of the end face and the plastic of the optical element and the optical element is molded to the light guide to form a connection between the glass of the end face and the plastic of the optical element that requires a withdrawal force of more than 80 N; and tempering of the light guide, wherein the light guide is capable of being sterilized and autoclaved.

17. The method as claimed in claim 16, further comprising, prior to the molding of the optical element, covering the end face of the light guide with the at least one plastic precursor.

18. A light guide for industrial, medical, or cosmetic applications, comprising:

an outer circumferential surface and an end face made of glass; and an optical element made of a transparent plastic comprising liquid silicone rubber, the optical element being directly molded to the end face so that the optical element is form fit to the end face and has a light exit surface that functions as a converging lens, a diverging lens, a light mixer, and any combinations thereof, wherein the end face comprises a chemical and/or physical pretreatment, the pretreatment forming a chemical bond between the glass of the end face and the plastic of the optical element, wherein the form fit and the chemical bond form a connection between the glass of the end face and the plastic of the optical element is resistant to withdrawal, and wherein electromagnetic radiation guided in the light guide when in an operational state is directed through the end face into the transparent plastic of the optical element and exits therefrom.

* * * * *